(12) United States Patent
Oohira

(10) Patent No.: US 8,233,107 B2
(45) Date of Patent: Jul. 31, 2012

(54) DISPLAY DEVICE

(75) Inventor: Eiji Oohira, Mobara (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 430 days.

(21) Appl. No.: 12/498,453

(22) Filed: Jul. 7, 2009

(65) Prior Publication Data

US 2010/0002166 A1 Jan. 7, 2010

(30) Foreign Application Priority Data

Jul. 7, 2008 (JP) ................................ 2008-177010

(51) Int. Cl.
*G02F 1/1333* (2006.01)
(52) U.S. Cl. ........................... 349/58; 349/122; 362/633
(58) Field of Classification Search .................... 349/58, 349/122, 96, 65; 362/633, 634, 632
See application file for complete search history.

(56) References Cited

U.S. PATENT DOCUMENTS

| 2007/0165170 A1* | 7/2007 | Fukuda ......................... 349/138 |
| 2009/0004408 A1* | 1/2009 | Nakanishi et al. ............... 428/12 |
| 2011/0019351 A1* | 1/2011 | Bayne et al. ............. 361/679.01 |

* cited by examiner

*Primary Examiner* — Thoi Duong
(74) *Attorney, Agent, or Firm* — Antonelli, Terry, Stout & Kraus, LLP.

(57) ABSTRACT

An object of the present invention is to increase the reliability in the assembly of display devices. The display device according to the present invention is provided with: a display panel; a mold frame for containing the above described display panel; and a front panel provided on a surface of the above described display panel on the viewer side, and the form of the above described mold frame in a plane is rectangular, with four corners, and at least two corners on a diagonal line, from among the above described four corners, have a cut structure with a diagonal side which is inclined relative to the two sides forming the corner.

10 Claims, 14 Drawing Sheets

DISPLAY DEVICE

The present application claims priority over Japanese Application JP 2008-177010 filed on Jul. 7, 2008, the contents of which are hereby incorporated into this application by reference.

BACKGROUND OF THE INVENTION (1) Field of the Invention

The present invention relates to a display device, and in particular, to a display device having a display panel, a mold frame for containing the above described display panel, and a front panel provided on the surface of the above described display panel, on the viewer side.

(2) Related Art Statement

Liquid crystal display modules (liquid crystal display devices) are one type of display device. As concerns liquid crystal display modules, TFT (thin film transistor) type liquid crystal display modules having a compact liquid crystal display panel with approximately 240×320×3 sub-pixels for color display are known and widely used as display portions for portable devices, such as portable phones.

These liquid crystal display modules are provided with a liquid crystal display panel and a mold frame for containing and supporting the liquid crystal display panel, and the liquid crystal display panel is contained in a recess provided in the mold frame.

Meanwhile, structures for liquid crystal display modules where a front panel is secured to a polarizing plate of the liquid crystal display panel on the viewer side using an adhesive material having approximately the same index of refraction as the polarizing plate are known (hereinafter referred to as hybrid panel structure). Hybrid panel structures are characterized by (1) being dust-free (few foreign substances mixed in), (2) being thinner, (3) having better outdoor visibility, and (4) having a higher luminance factor in comparison with structures where a front panel is provided on the polarizing plate of the liquid crystal display panel on the viewer side with a space in between.

SUMMARY OF THE INVENTION

Problem to be Solved by the Invention

The present inventor examined liquid crystal display modules having a hybrid panel structure where the four sides of the front panel are located outside the four sides of the mold frame for supporting the liquid crystal module, and the lower surface of portions sticking out from the mold frame of the front panel is secured to the housing of a portable device (for example a portable phone) using tape in response to demand. The present inventor found the following problems while examining liquid crystal display modules having a hybrid panel structure.

FIGS. 12 to 14 are diagrams showing a liquid crystal display module having a hybrid panel structure examined prior to the present invention.

FIG. 12 is a diagram showing the liquid crystal display module having a hybrid panel structure as viewed from the side opposite to the viewer side (bottom view).

FIG. 13 is a diagram showing the liquid crystal display module having a hybrid panel structure in a state where it is incorporated in the display portion of a portable device as viewed from the side opposite to the viewer side.

FIG. 14 is a diagram showing the liquid crystal display module having a hybrid panel structure in FIG. 13 in a case where the mold frame and the front panel are rotated so that they do not match in position (bottom view).

In FIGS. 12 to 14, 5 is a flexible printed circuit board (FPC), 6 is a mold frame, 7 is a front panel, 8 is a reflective sheet, 20 is a housing, 1 is an opening and 23a, 23b, 23c and 23d are the clearance.

The liquid crystal display modules having a hybrid panel structure examined prior to the present invention have such a structure that the four sides of the front panel 7 are located outside the four sides of the mold frame 6 for containing and supporting the liquid crystal display panel, as shown in FIG. 12, and the lower surface of the portion of the front panel 7 that sticks out from the mold frame 6 of the front panel 7 is secured to the housing of a portable device (for example a portable phone) using tape.

As shown in FIG. 13, in liquid crystal display modules having this structure, the mold frame 6 is provided inside the opening 21 of the housing 20 of the portable device when incorporated in the display portion of the portable device, and therefore, it is necessary to secure a clearance (23a, 23b, 23c and 23d) between the side walls of the opening 21 of the housing 20 and the mold frame 6 of the liquid crystal display module.

Meanwhile, the front panel 7 is secured to the liquid crystal display panel on the viewer side, so that the liquid crystal display panel is contained in and supported by the mold frame 7, and therefore, the front panel 7 must be pasted to the liquid crystal display panel on the viewer side with high precision in the manufacture of the liquid crystal display module, or else the position of the front panel 7 secured to the liquid crystal display panel on the viewer side and the mold frame 6 for containing and supporting the liquid crystal display panel will not match. Mismatch in the position includes mismatch in the position resulting from translation in the X direction and Y direction, as well as mismatch in the position resulting from rotation.

The clearance (23a, 23b, 23c and 23d) between the side walls of the opening 21 of the housing 20 and the mold frame 6 of the liquid crystal display module is necessary for the mold frame 6 of the liquid crystal display module to be efficiently contained within the opening 21 of the housing 20. However, it is important for the housing 20 of the portable device to be compact, and therefore, a wide clearance (23a, 23b, 23c and 23d) cannot be secured between the housing 20 of the portable device and the mold frame 6 of the liquid crystal display module.

Thus, it is desirable to secure a clearance (23a, 23b, 23c and 23d) between the side walls of the opening 21 of the housing 20 and the mold frame 6 of the liquid crystal display module, so that only the positional mismatch caused by translation in the X direction and the Y direction, from among positional mismatching between the front panel and the mold frame, is tolerable taking the compactness of the housing 20 into consideration.

As shown in FIG. 14, however, when positional mismatch resulting from rotation is added to positional mismatch resulting from translation in the X direction and Y direction, the corners of the mold frame 6 make contact or interfere with the housing 20, making assembly impossible or the probability high that the liquid crystal display panel may be damaged through impact after assembly.

Though this problem can be solved by widening the clearance (23a, 23b, 23c and 23d) between the side walls of the opening 21 of the housing 20 and the mold frame 6 of the liquid crystal display module, the housing 20 cannot be made compact when the clearance is too wide.

An object of the present invention is to provide a technology which can increase the reliability in the assembly of display devices.

The above described and other objects and novel features of the present invention will become more apparent from the description of the present specification and the accompanying drawings.

Means for Solving Problem

Typical inventions from among the inventions disclosed in the present specification are briefly described below.

(1) A display device having: a display panel; a mold frame for containing the above described display panel; and a front panel provided on a surface of the above described display panel on the viewer side, where the form of the above described mold frame in a plane is rectangular, with four corners, and at least two corners on a diagonal line, from among the above described four corners, have a cut structure with a diagonal side which is inclined relative to the two sides forming the corner.

(2) The display device according to the above (1), where, when one of the two sides forming a corner is a first side and the other is a second side in the above described two corners, the intersection of the above described first side and the above described second side if the two virtually extend is S, the intersection of the above described first side and the above described diagonal side is P1, the intersection of the above described second side and the above described diagonal side is P2, the distance between the above described intersection P1 and the above described intersection S is A, and the distance between the above described intersection P2 and the above described intersection S is B, A>0.5 mm and B>0.5 mm.

(3) The display device according to the above (1), where the above described front panel is greater in size than the above described mold frame in a plane.

(4) The display device according to the above (1), where all of the above described four corners have a cut structure with a diagonal side which is inclined relative to the two sides forming the corner.

(5) The display device according to the above (1), where the above described display panel is a liquid crystal display panel having a polarizing plate on a surface on the viewer side, and the above described front panel is secured to the above described polarizing plate using an adhesive material.

(6) A display device having: a display panel; a mold frame for containing the above described display panel; and a front panel provided on a surface of the above described display panel on the viewer side, where the form of the above described mold frame in a plane is rectangular, with four corners, and at least two corners on a diagonal line, from among the above described four corners, have a rounded structure with a curve connecting the two sides forming the corner.

(7) The display device according to the above (6), where the above described curve is an arc with a radius of no less than 1.0 mm.

(8) The display device according to the above (6), where the above described front panel is greater than the above described mold frame in a plane.

(9) The display device according to the above (6), where all of the above described four corners have a rounded structure with a curve connecting the two sides forming the corner.

(10) The display device according to the above (6), where the above described display panel is a liquid crystal display panel having a polarizing plate on a surface on the viewer side, and the above described front panel is secured to the above described polarizing plate using an adhesive material.

Effects of the Invention

The effects of typical inventions from among the inventions disclosed in the present specification are briefly described below.

According to the present invention, it is possible to increase the reliability in the assembly of display devices.

DETAILED DESCRIPTION OF THE INVENTION

In the following, the embodiments of the present invention are described in detail in reference to the drawings. Here, the same symbols are attached to components having the same function in all of the diagrams illustrating the embodiments of the invention, and the descriptions thereof are not repeated.

First Embodiment

In the first embodiment, an example where the present invention is applied to a liquid crystal display module (liquid crystal display device), which is an example of a display device, is described.

FIGS. 1 to 10 are diagrams showing the liquid crystal display module according to the first embodiment of the present invention.

Figure 1:
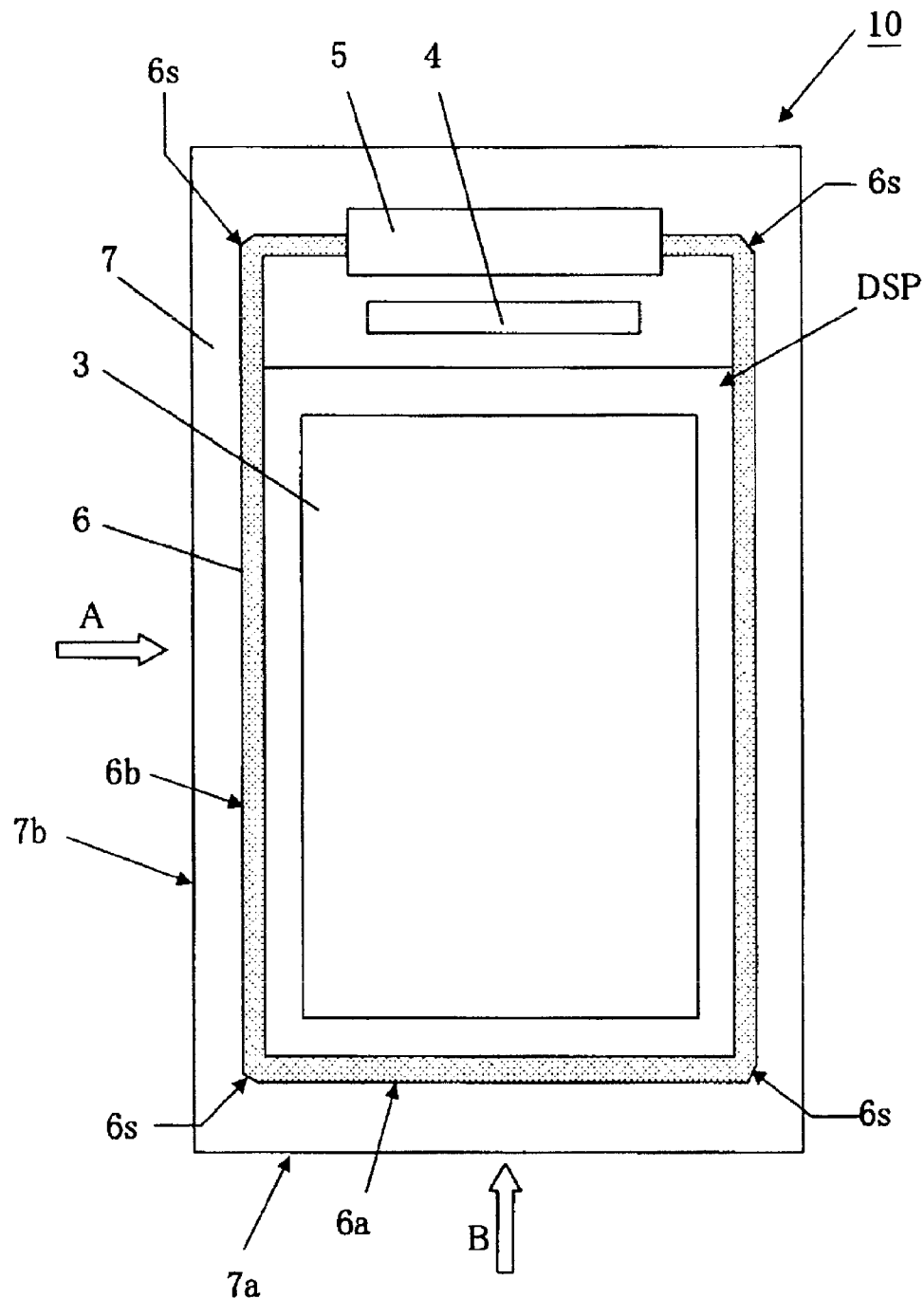
FIG. 1 is a plan diagram showing the liquid crystal display module according to the first embodiment of the present invention as viewed from the viewer side.
Figure 2:
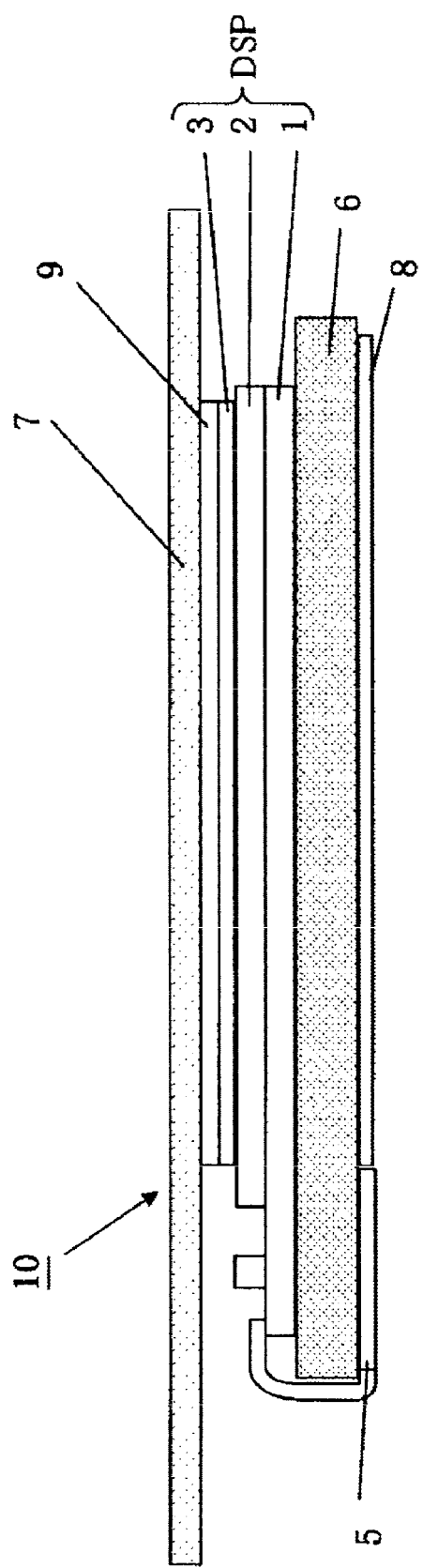
FIG. 2 is a side diagram showing the liquid crystal display module as viewed in the direction of the arrow A in FIG. 1.
Figure 3:
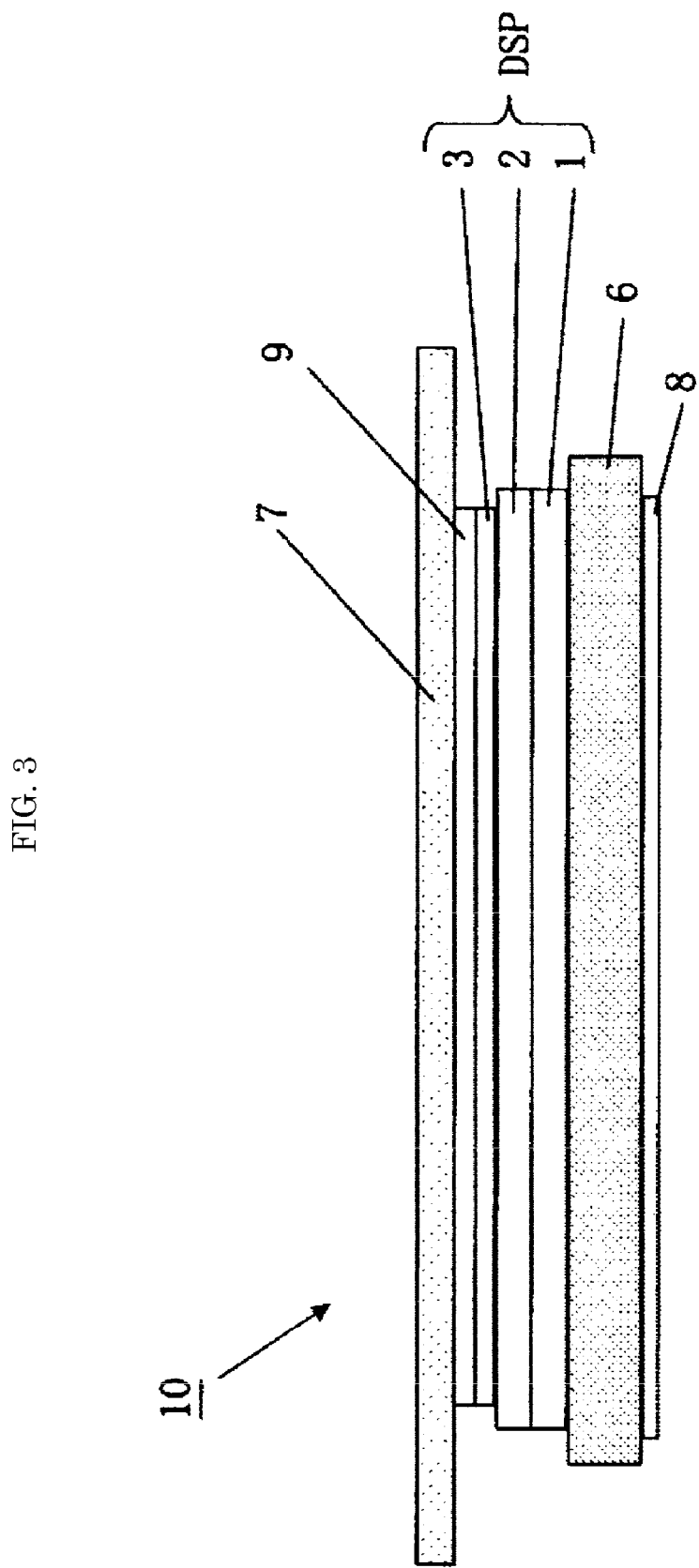
FIG. 3 is a side diagram showing the liquid crystal display module as viewed in the direction of the arrow B in FIG. 1.
Figure 4:
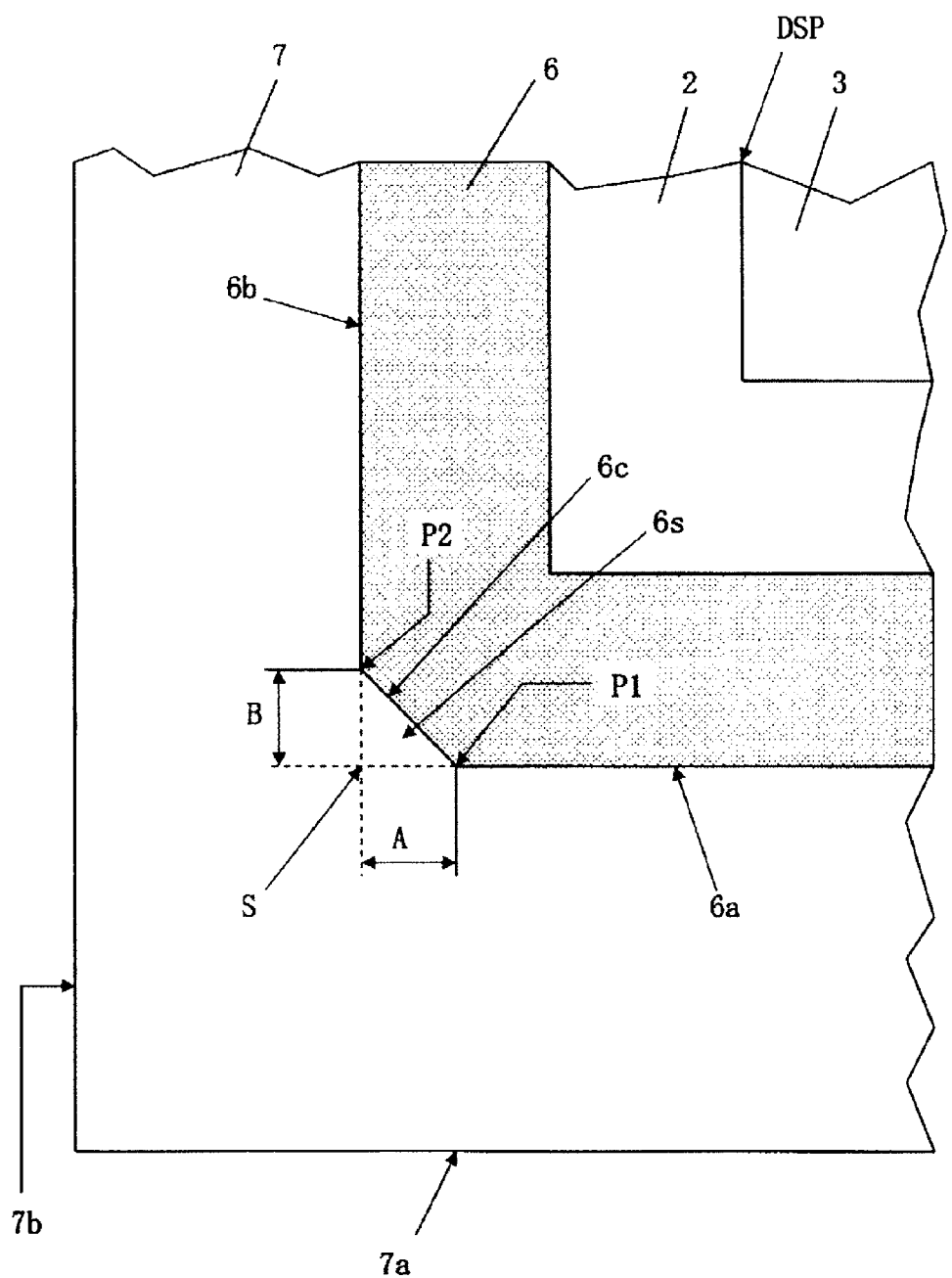
FIG. 4 is a plan diagram showing an enlargement of a portion of FIG. 1.
Figure 5:
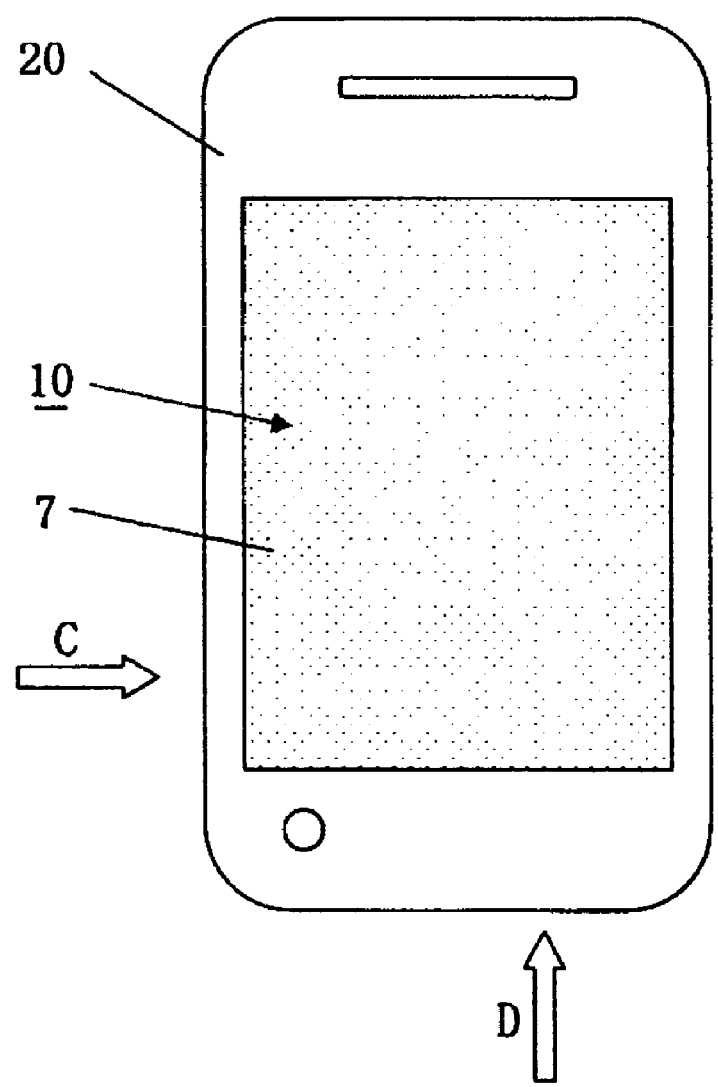
FIG. 5 is a plan diagram showing the display portion of a portable device.
Figure 6:
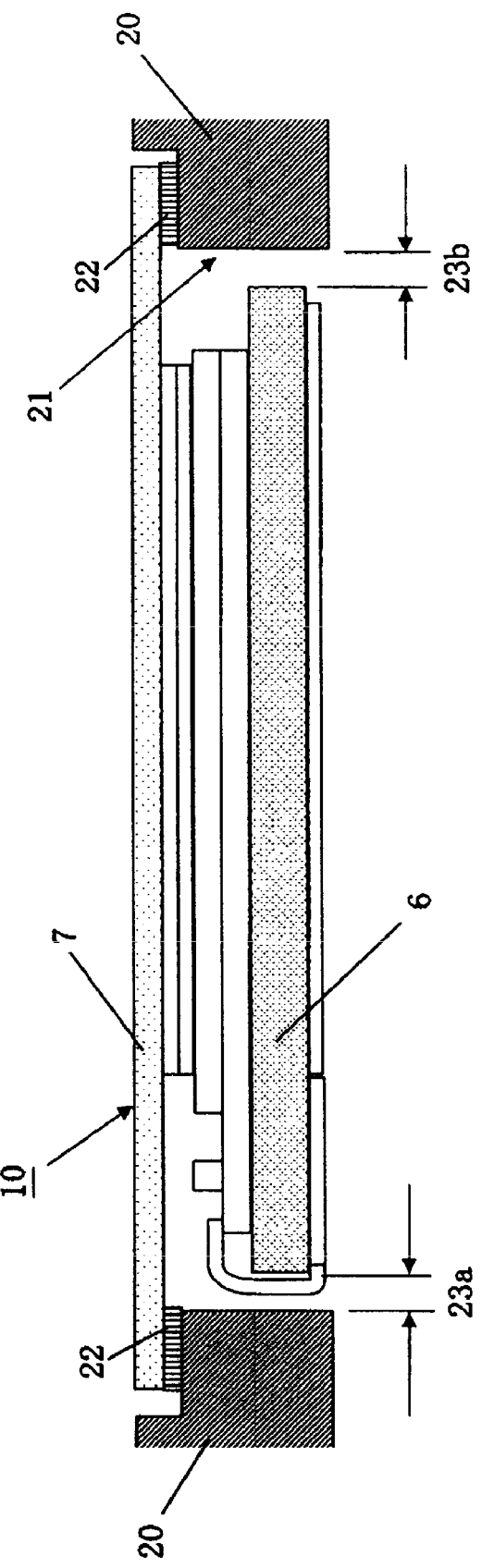
FIG. 6 is a diagram showing the positional relationship between the housing of a portable device and the mold frame of the liquid crystal display module as viewed in the direction of the arrow C in FIG. 5.
Figure 7:
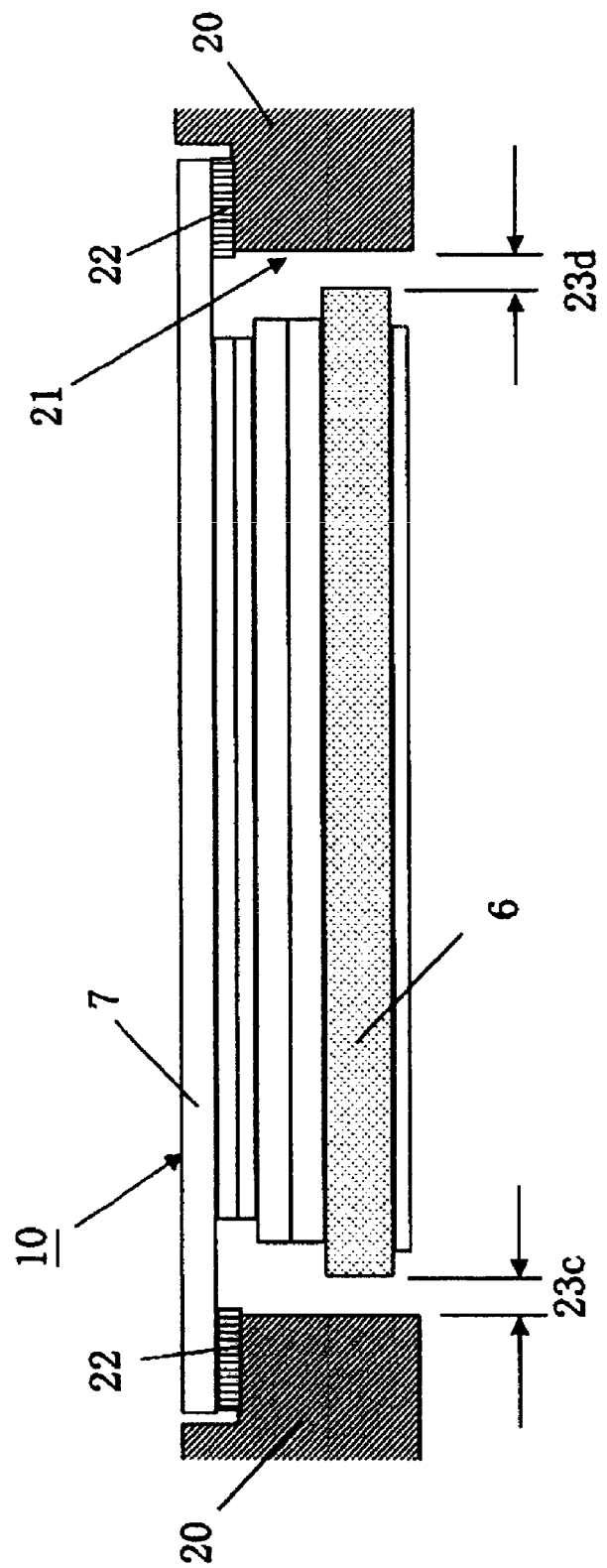
FIG. 7 is a diagram showing the positional relationship between the housing of a portable device and the mold frame of the liquid crystal display module as viewed in the direction of the arrow D in FIG. 5.
Figure 8:
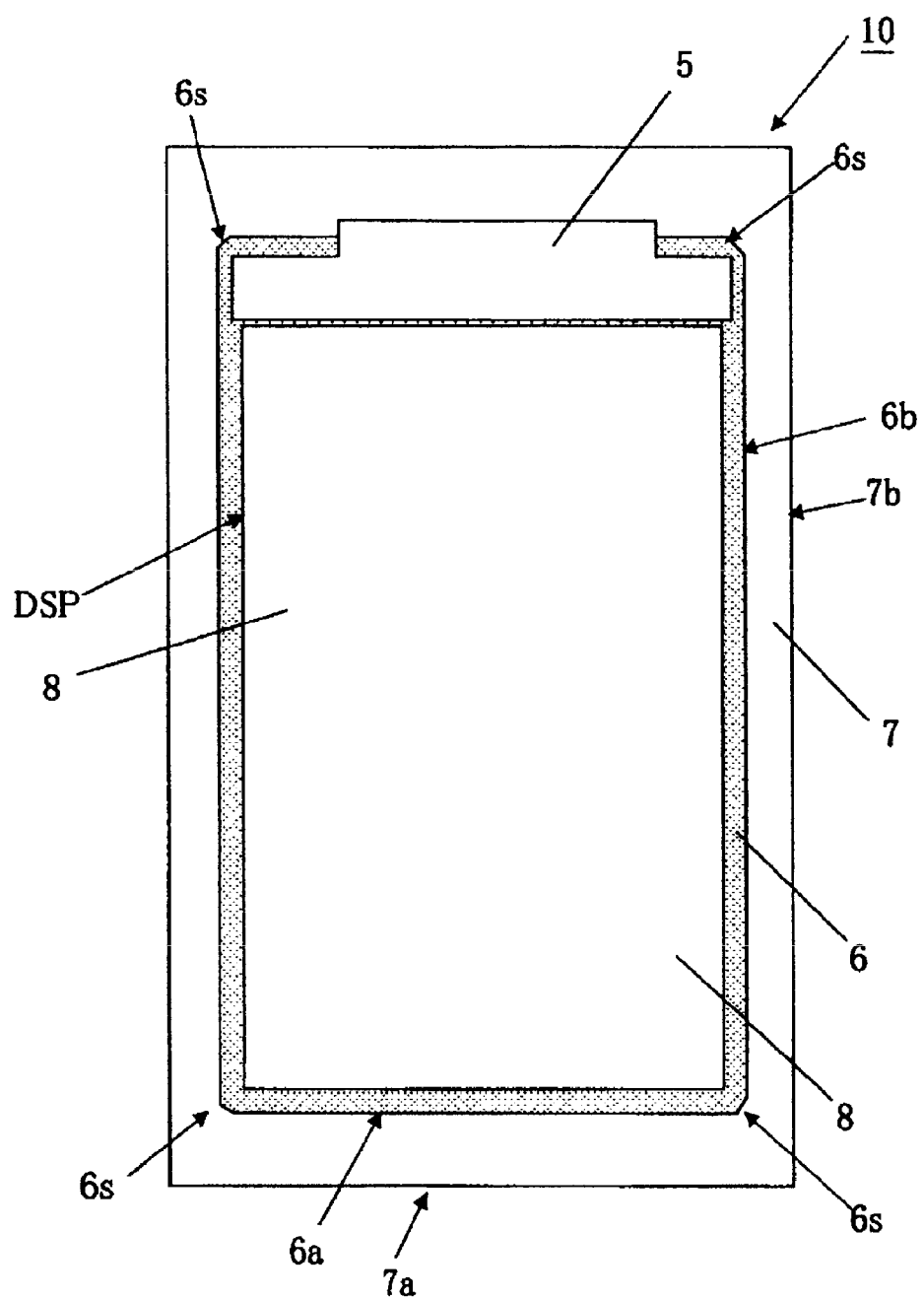
FIG. 8 is a diagram showing the liquid crystal display module according to the first embodiment of the present invention as viewed from the side opposite to the viewer side (bottom view)
Figure 9:
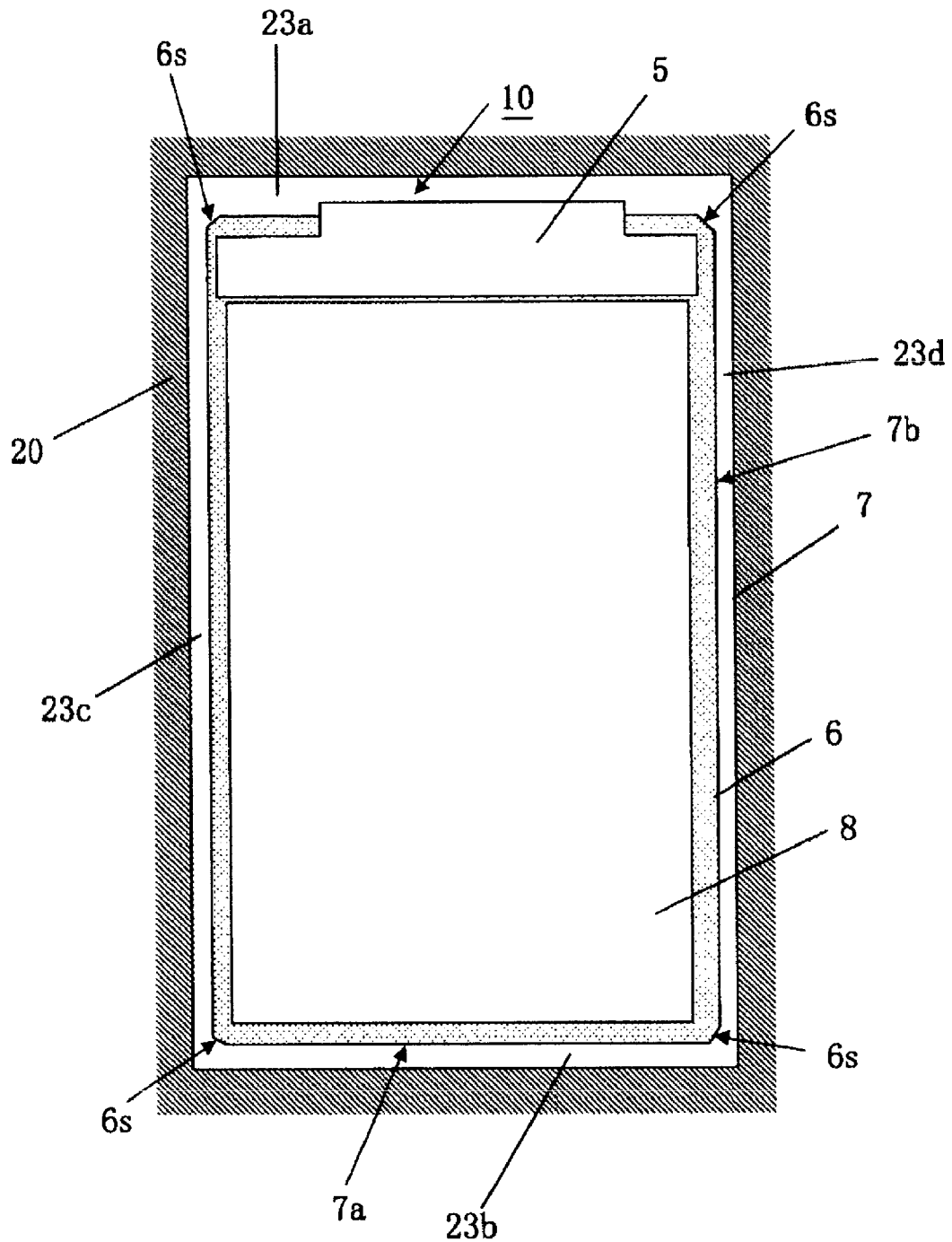
FIG. 9 is a diagram showing the liquid crystal display module according to the first embodiment of the present invention when incorporated in the display portion of a portable device as viewed from the side opposite to the viewer side (bottom view)
Figure 10:
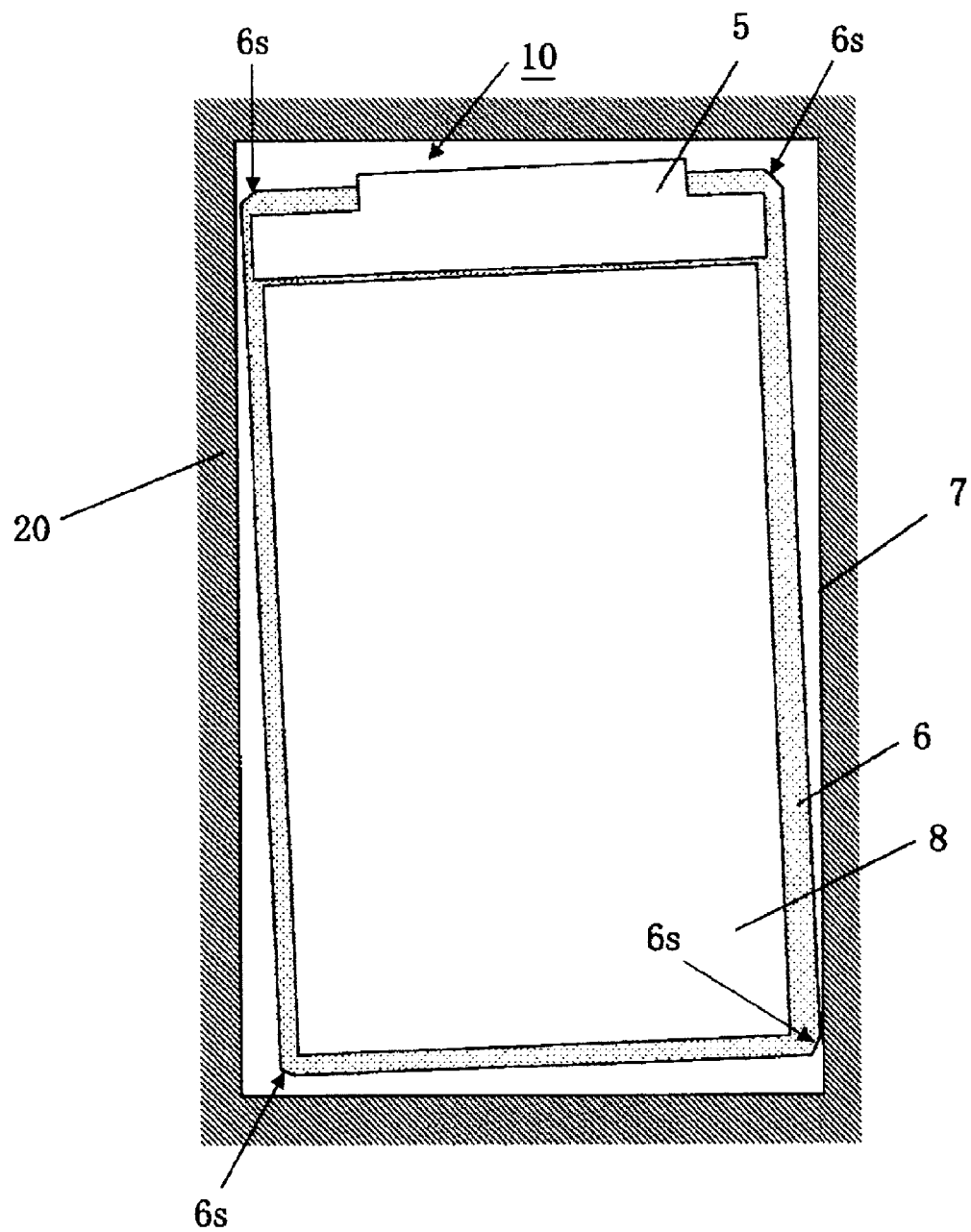
FIG. 10 is a diagram showing the mold frame of the liquid crystal display module and front panel in FIG. 9 with a mismatch in location resulting from rotation (bottom view)

FIG. 1 is a plan diagram showing the liquid crystal display module as viewed from the viewer side;

FIG. 2 is a side diagram showing the liquid crystal display module as viewed in the direction of the arrow A in FIG. 1;

FIG. 3 is a side diagram showing the liquid crystal display module as viewed in the direction of the arrow B in FIG. 1;

FIG. 4 is a plan diagram showing an enlargement of a portion of FIG. 1;

FIG. 5 is a plan diagram showing the display portion of a portable device;

FIG. 6 is a diagram showing the positional relationship between the housing of a portable device and the mold frame of the liquid crystal display module as viewed in the direction of the arrow C in FIG. 5;

FIG. 7 is a diagram showing the positional relationship between the housing of a portable device and the mold frame of the liquid crystal display module as viewed in the direction of the arrow D in FIG. 5;

FIG. 8 is a diagram showing the liquid crystal display module as viewed from the side opposite to the viewer side (bottom view);

FIG. 9 is a diagram showing the liquid crystal display module when incorporated in the display portion of a portable device as viewed from the side opposite to the viewer side (bottom view); and FIG. 10 is a diagram showing the mold frame of the liquid crystal display module and front panel in FIG. 9 with a mismatch in location resulting from rotation (bottom view).

Here, FIG. 1 is a perspective diagram showing the structure beneath the front panel as viewed from the top.

The liquid crystal display module 10 according to the first embodiment is a TFT (thin film transistor) type liquid crystal display module having a compact liquid crystal display panel with approximately 240×320×3 pixels for color display, and for use as a display portion in a portable device, for example a portable phone.

As shown in FIGS. 1 to 3, the liquid crystal display module 10 according to the first embodiment is provided with a liquid crystal display panel DSP, a flat front panel 7 provided on the surface of the liquid crystal display panel DSP on the viewer side, and a mold frame 6 for containing and supporting the liquid crystal display panel DSP on the side opposite to the viewer side.

The liquid crystal display panel DSP has a first substrate 1, a second substrate 2, a liquid crystal layer (not shown) sandwiched between the first substrate 1 and the second substrate 2, a semiconductor chip 4 on which a drive circuit is mounted, a flexible printed circuit board 5 connected to at least one side of the first substrate 1, and a polarizing plate 3 pasted on the surface of the second substrate 2, on the side opposite to the liquid crystal layer. The side of the second substrate 2 opposite to the liquid crystal layer is the viewer side. Here, though not shown, a polarizing plate is provided also on the side of the first substrate 1 opposite to the liquid crystal layer.

The liquid crystal display panel DSP has a display region where a number of pixels are arranged in a matrix. Each of the number of pixels has a pixel electrode and a counter electrode.

Transparent insulating substrates, such as of glass, are used as the first and second substrates (1, 2). Positive type liquid crystal or negative type liquid crystal is used in the liquid crystal layer.

The form of the first and second substrate (1, 2) in a plane is rectangular, with four corners, and the rectangle has long sides and short sides in the present embodiment. The long sides of the first substrate 1 are longer than the long sides of the second substrate 2, so that the first substrate 1 has a region which does not overlap with the second substrate 2 (hereinafter referred to as non-overlapping region) in the configuration. A semiconductor chip 4 is mounted in the non-overlapping region on the surface of the first substrate 1 on the liquid crystal layer side.

Thin film transistors, pixel electrodes and the like are formed on the first substrate 1, and color filters and the like are formed on the second substrate 2. Here, the liquid crystal display panel DSP according to the present embodiment is an IPS type liquid crystal display panel, and therefore, the counter-electrodes are provided on the first substrate 1 side, while in the case of a TN type or VA type liquid crystal display panel, counter-electrodes are provided on the second substrate 2 side. Here, 8 is a reflective sheet.

The outer periphery of the mold frame 6 is rectangular in a plane, with four corners 6s, and the rectangle in the first embodiment has long sides 6b and short sides 6a. The form of the mold frame 6 is similar to that of the liquid crystal display panel DSP in a plane, and the mold frame 6 is greater in size than the liquid crystal display panel DSP in a plane, so that the outline (sides) of the outer periphery of the mold frame 6 is located outside the outline (sides) of the outer periphery of the liquid crystal display panel. A mold frame made of a white resin is used as the mold frame 6.

The front panel 7 is pasted to the polarizing plate 3 of the liquid crystal display panel DSP on the second substrate 2 side and secured using an adhesive material 9 having the same index of refraction as the polarizing plate 3. The front panel 7 is in rectangular form in a plane, with four corners, and the rectangle in the first embodiment has long sides 7b and short sides 7a. The form of the front panel 7 is similar to that of the mold frame 6 in a plane, and the front panel 7 is greater in size than the mold frame 6 in a plane, so that the outline (sides) of the outer periphery of the front panel 7 is located outside the outline (sides) of the outer periphery of the mold frame 6. The front panel 7 is formed of a transparent insulating material, such as glass or a resin.

As shown in FIG. 4, at least two corners 6s on a diagonal line, from among the four corners 6s of the mold frame 6, have a cut structure with a diagonal side 6c which is inclined relative to the two sides (a short side 6a and a long side 6b) forming the corner 6s. In the present embodiment, all four corners 6s have a cut structure with a diagonal side 6c.

In addition, in the corners 6s having a cut structure with a diagonal side 6c, when one of the two sides (short side 6a or long side 6b) forming a corner 6s is a first side (for example a short side 6a) and the other is a second side (for example a long side 6b), the intersection of the above described first side and the above described second side if the two virtually extend is S, the intersection of the above described first side and the above described diagonal side 6c is P1, the intersection of the above described second side and the above described diagonal side is P2, the distance between the above described intersection P1 and the above described intersection S is A, and the distance between the above described intersection P2 and the above described intersection S is B, A>0.5 mm and B>0.5 mm.

As described above, the liquid crystal display module 10 according to the first embodiment has a structure where a front panel 7 is secured to the polarizing plate 3 of the liquid crystal display panel DSP, on the viewer side, using an adhesive material 9 having the same index of refraction as the polarizing plate 3, that is to say, a hybrid panel structure. In addition, the four sides (short sides 7a and long sides 7b) of the front panel 7 are located outside the four sides (short sides 6a and long sides 6b) of the mold frame 6 for containing and supporting the liquid crystal display module DSP, and the lower surface of the portion of the front panel 7 which sticks out from the mold frame 6 is secured to the housing of a portable device (for example a portable phone) in the structure.

As shown in FIGS. 5 to 7, the thus formed liquid crystal display module 10 can be incorporated in a portable device as a display portion.

The portable device has a housing 20 and the liquid crystal display module 10 in the display portion. The housing 20 contains the liquid crystal display panel DSP in the liquid crystal display module 10 and the mold frame 6, and has an opening 21 of which the opening end is located inside the periphery of the front panel 7. The lower surface (surface on liquid crystal display panel DSP side) of the periphery portion (portion sticking out form the mold frame 6) of the front panel 7 is secured to a securing portion of the housing 20 outside the opening using an adhesive material 22, such as tape, and thus, the liquid crystal display panel DSP and the mold frame 6 can be provided inside the housing 20 through the opening 21.

Thus, as shown in FIGS. 6 and 7, the liquid crystal display module 10 according to the first embodiment has a structure where the four sides (the short sides 7a and the long sides 7b) of the front panel 7 are located outside the four sides (the short sides 6a and the long sides 6b) of the mold frame 6 for containing and supporting the liquid crystal display panel DSP, and the lower surface of the portion of the front panel 7 which sticks out from the mold frame 6 is secured to the housing 20 of a portable device using an adhesive material 22, such as tape.

As described above, it is desirable to secure a clearance (23a, 23b, 23c and 23d) between the side walls of the opening 21 of the housing 20 and the mold frame 6 of the liquid crystal display module, so that only the positional mismatch caused by translation in the X direction and the Y direction, from among positional mismatching between the front panel 7 and the mold frame 6, is tolerable, taking the compactness of the housing 20 into consideration.

Figure 14:
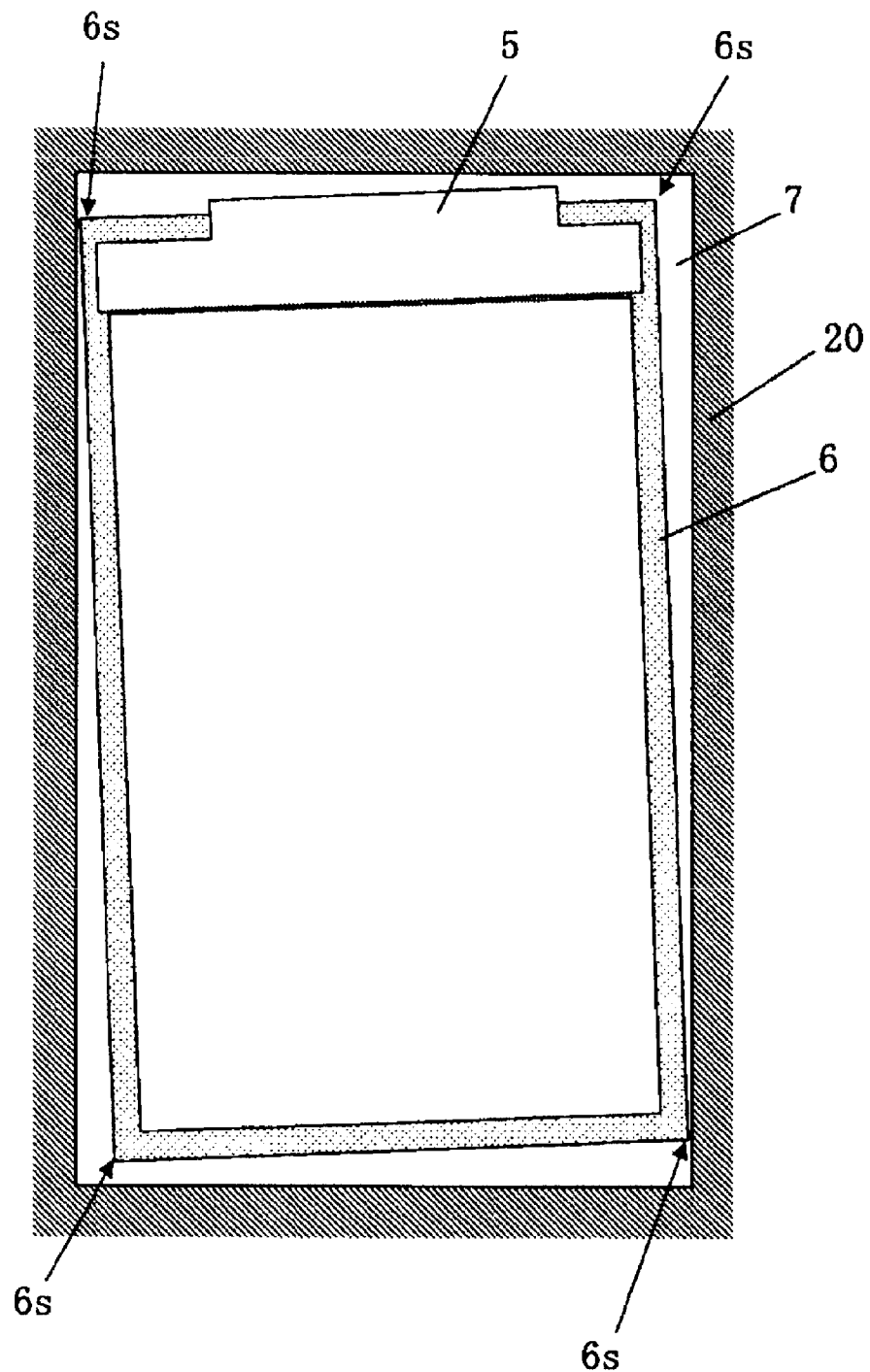
FIG. 14 is a diagram showing the mold frame of a liquid crystal display module having a hybrid panel structure and front panel in FIG. 13 with a mismatch in location resulting from rotation (bottom view).

As shown in FIG. 14, however, when positional mismatch resulting from rotation is added to positional mismatch resulting from translation in the X direction and Y direction, the corners of the mold frame 6 make contact or interfere with the housing 20, making assembly impossible or the probability high that the liquid crystal display panel may be damaged through impact after assembly.

Though this problem can be solved by widening the clearance (23a, 23b, 23c and 23d) between the side walls of the opening 21 of the housing 20 and the mold frame 6 of the liquid crystal display module 10, the housing 20 cannot be made compact when the clearance is too wide.

Thus, as shown in FIG. 4, the four corners 6s of the mold frame 6 according to the first embodiment have a cut structure with a diagonal side 6c which is inclined relative to the two sides (a short side 6a and a long side 6b) forming the corner 6s.

In this configuration, problems with the corners 6s of the mold frame 6 making contact with the side wall of the opening 21 in the housing 21 due to mismatching in position between the front panel 7 and the mold frame 6 resulting from rotation can be prevented. That is to say, a margin for preventing the corners 6s of the mold frame 6 and the side walls of the opening 21 in the housing 20 from making contact can be secured against mismatching in position resulting from rotation. As a result, the reliability in the assembly of the liquid crystal display module 10 can be increased. In addition, the reliability in the assembly of the liquid crystal display module 10 can be increased while keeping the housing slim.

Here, mismatch in position between the front panel 7 and the mold frame 6 resulting from rotation includes first mismatch resulting from rotation, where a diagonal line of the mold frame 6 is inclined relative to a diagonal line of the front panel 7 by an angle of +θ, and second mismatch resulting from rotation, where a diagonal line of the mold frame 6 is inclined relative to a diagonal line of the front panel 7 by an angle of −θ.

Accordingly, at least two corners 6s on a diagonal line from among the four corners 6s of the mold frame 6 have a cut structure with a diagonal side 6c which is inclined relative to the two sides (short side 6a and long side 6b) forming the corner 6s, and thus, a margin for preventing contact between the corners 6s of the mold frame 6 and the side walls of the opening 21 in the housing 20 can be secured against mismatching resulting from rotation of the first or second mismatch resulting from rotation.

In the first embodiment, all four corners 6s of the mold frame 6 have a cut structure with a diagonal side 6c which is inclined relative to the two sides (a short side 6a and a long side 6b) forming the corner 6s, and therefore, a margin for preventing contact between the corners 6s of the mold frame 6 and the side walls of the opening 21 in the housing 20 can be secured against mismatching resulting from rotation of the first and second mismatch resulting from rotation.

As for the clearance (23a, 23b, 23c and 23d) between the side walls of the opening 21 in the housing 20 and the mold frame 6 of the liquid crystal display module 10, the clearance 23a and 23b is approximately 0.35 mm and the clearance 23c and 23d is approximately 1 mm. The smaller the clearance (23a, 23b, 23c and 23d) between the side walls of the opening 21 in the housing 20 and the mold frame 6 of the liquid crystal display module 10 is, the easier the mold frame 6 and the side walls of the opening 21 in the housing 20 make contact due to mismatch resulting from rotation. Accordingly, it is necessary to set the amount of cut at the corners 6s of the mold frame 6 (A and B in FIG. 4) taking the clearance into consideration, and A>0.5 mm and B>0.5 mm is desirable.

Second Embodiment

Figure 11:
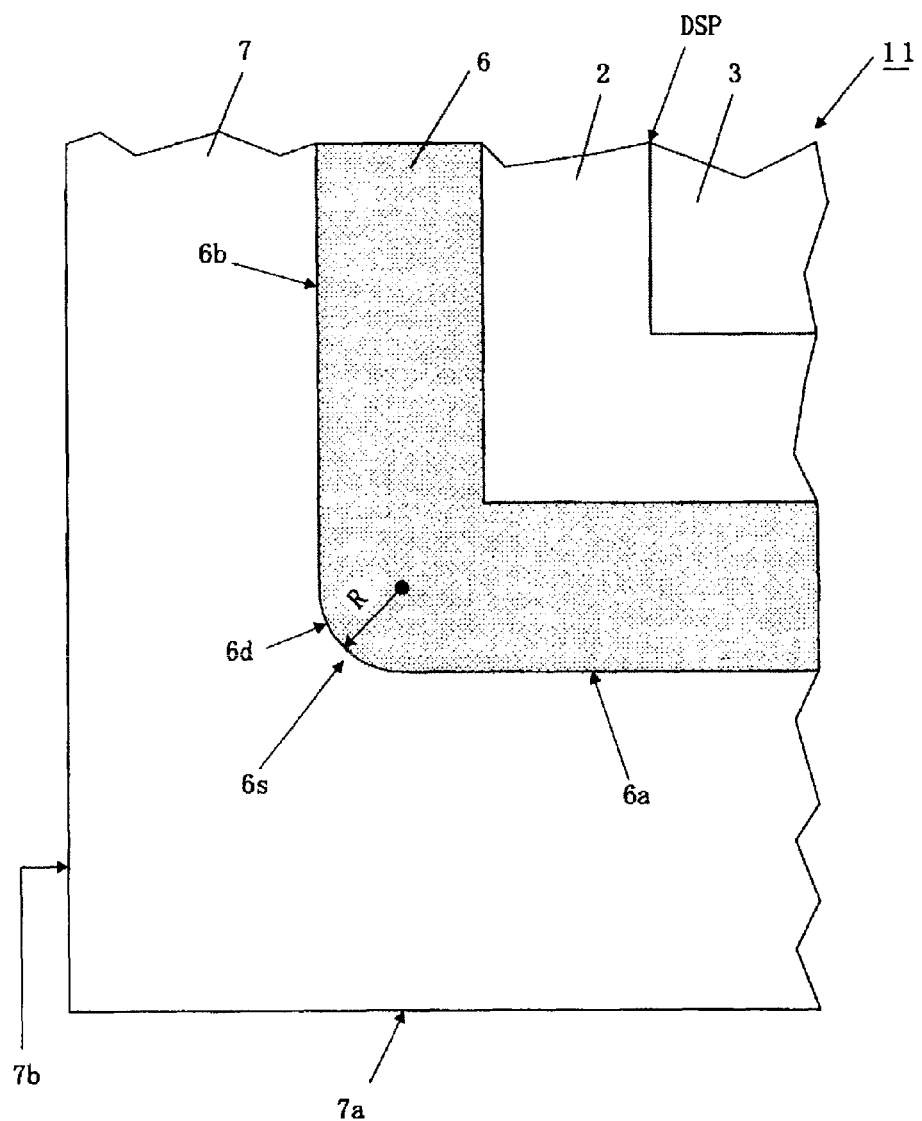
FIG. 11 is a plan diagram showing a portion of the liquid crystal display module according to the second embodiment of the present invention.
Figure 12:
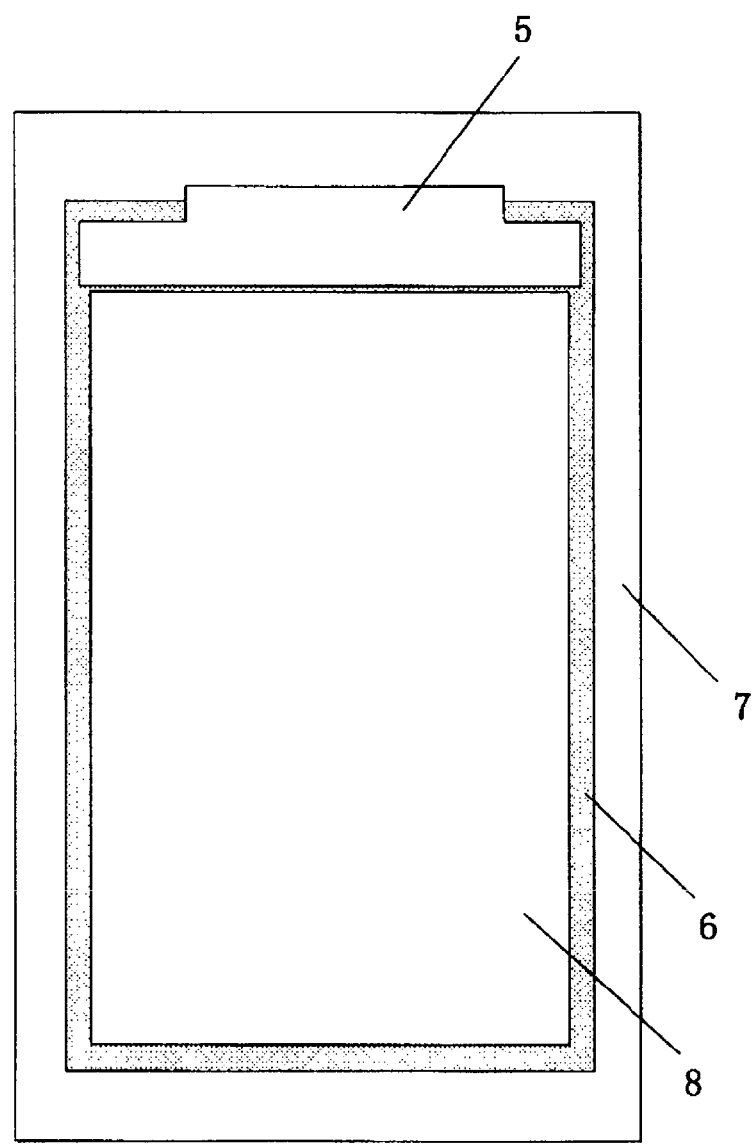
FIG. 12 is a diagram showing a liquid crystal display module having a hybrid panel structure examined prior to the present invention as viewed from the side opposite to the viewer side (bottom view)
Figure 13:
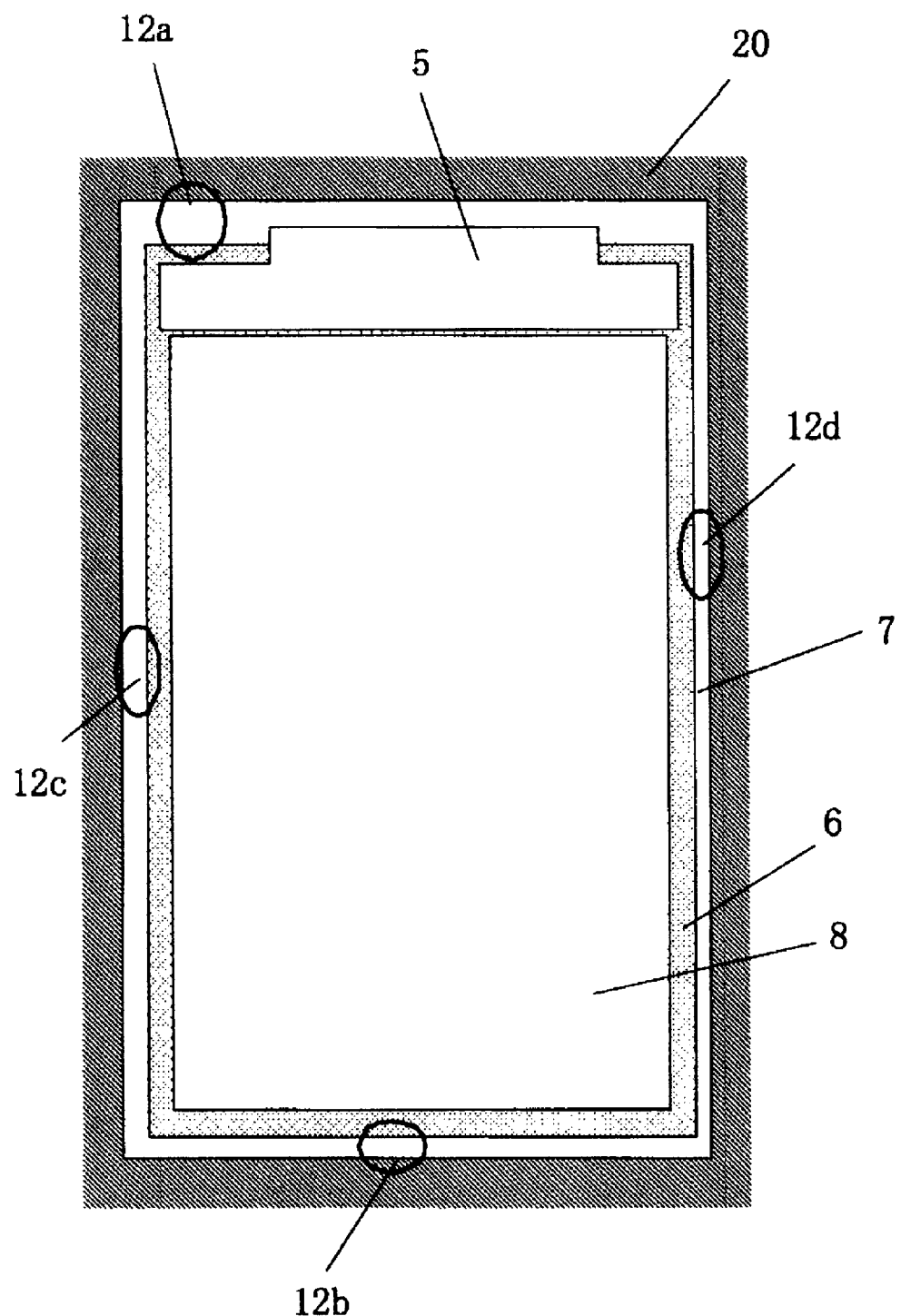
FIG. 13 is a diagram showing the liquid crystal display module having a hybrid panel structure in FIG. 12 when incorporated in the display portion of a portable device as viewed from the side opposite to the viewer side.

FIG. 11 is a plan diagram showing a portion of the liquid crystal display module according to the second embodiment of the present invention.

The liquid crystal display module 11 according to the second embodiment has basically the same configuration as the above described first embodiment, except in the following points.

At least two corners 6s on a diagonal line from among the four corners 6s of the mold frame 6 have a rounded structure with a curve 6d which connects the two sides (a short side 6a and a long side 6b) forming the corner 6s according to the second embodiment. In the present embodiment, all four corners 6s have a rounded structure with a curve 6d.

In addition, the curve 6*d* is an arc with a radius R of no less than 1.0 mm.

The same effects as with the above described first embodiment can be gained with the second embodiment having this configuration.

In the second embodiment also, it is necessary to set the rounding of the corners 6*s* of the mold frame 6 taking the clearance (23*a*, 23*b*, 23*c* and 23*d*) between the side walls of the opening 21 in the housing 20 and the mold frame 6 of the liquid crystal display module 10 into consideration, and it is desirable for the curve 6*d* to be an arc having a radius of no less than 0.5 mm.

Though a liquid crystal display module having a liquid crystal display panel is described as an example of a display panel in the above embodiment, the present invention is not limited to this, and can be applied to display modules having another type of display panel, for example an organic EL display panel or an inorganic EL display panel.

Though the present inventor's invention is described concretely on the basis of the above embodiments, the present invention is not limited to the above described embodiments, and various modifications are, of course, possible, as long as they do not deviate from the gist of the present invention.

What is claimed is:

1. A display device, comprising:
   a display panel;
   a mold frame for containing said display panel; and
   a front panel provided on a first surface of said display panel on the viewer side, characterized in that
   the form of said mold frame in a plane parallel to said first surface is rectangular, with four corners, and at least two corners on a diagonal line, from among said four corners, have a cut structure with a diagonal side which is inclined relative to the two sides forming the corner,
   said display panel includes a polarizing plate on said first surface on the viewer side,
   said front panel is greater in size than said mold frame in said plane, and is secured to said polarizing plate,
   said front panel has a periphery portion which is located outside said mold frame, and
   said display panel is provided inside a housing through an opening of said housing by securing a surface on the viewer side of said display panel of said periphery portion of said front panel to said housing.

2. The display device according to claim 1, characterized in that
   when one of the two sides forming a corner is a first side and the other is a second side in said two corners, the intersection of said first side and said second side if the two virtually extend is S, the intersection of said first side and said diagonal side is P1, the intersection of said second side and said diagonal side is P2, the distance between said intersection P1 and said intersection S is A, and the distance between said intersection P2 and said intersection S is B, A>0.5 mm and B>0.5 mm.

3. The display device according to claim 1, characterized in that all of said four corners have a cut structure with a diagonal side which is inclined relative to the two sides forming the corner.

4. The display device according to claim 1, wherein said mold frame is comprised of resin.

5. The display device according to claim 1, wherein the front panel is secured to the polarizing plate by an adhesive material.

6. A display device, comprising:
   a display panel;
   a mold frame for containing said display panel; and
   a front panel provided on a first surface of said display panel on the viewer side, characterized in that
   the form of said mold frame in a plane parallel to said first surface is rectangular, with four corners, and at least two corners on a diagonal line, from among said four corners, have a rounded structure with a curve connecting the two sides forming the corner,
   said display panel includes a polarizing plate on said first surface on the viewer side, said front panel is greater in size than said mold frame in said plane, and is secured to said polarizing plate,
   said front panel has a periphery portion which is located outside said mold frame, and
   said display panel is provided inside a housing through an opening of said housing by securing a surface on the viewer side of said display panel of said periphery portion of said front panel to said housing.

7. The display device according to claim 6, characterized in that said curve is an arc with a radius of no less than 1.0 mm.

8. The display device according to claim 6, characterized in that all of said four corners have a rounded structure with a curve connecting the two sides forming the corner.

9. The display device according to claim 6, wherein said mold frame is comprised of resin.

10. The display device according to claim 6, wherein the front panel is secured to the polarizing plate by an adhesive material.

\* \* \* \* \*